Figure 1:
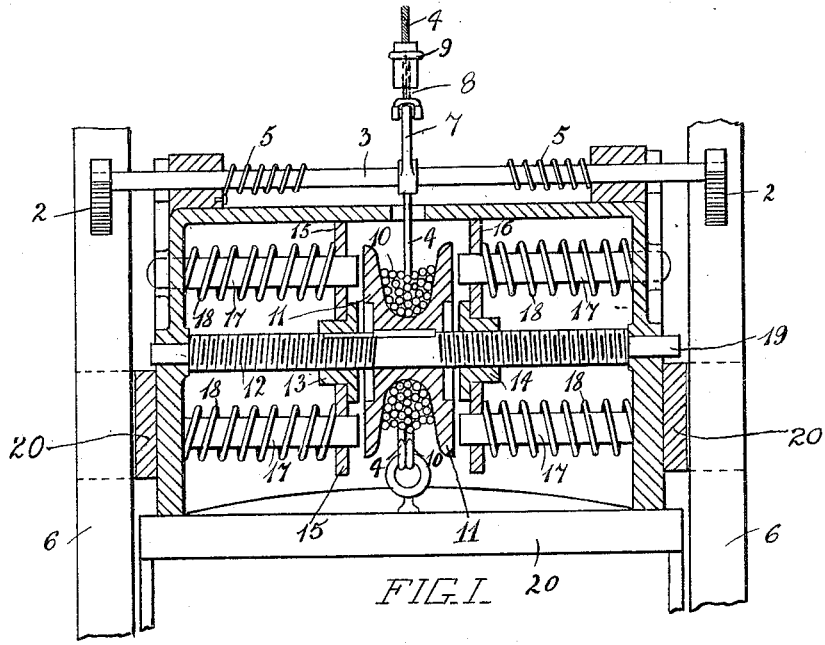

S. W. RICHARDSON & W. STAVELEY.
SAFETY APPARATUS FOR MINING CAGES.
APPLICATION FILED MAY 7, 1913.

1,103,841.

Patented July 14, 1914.

Witnesses
Fred Pohl
H. R. Dugan

S W Richardson
W Staveley
Inventors
By Croydon Marks
Attorney.

UNITED STATES PATENT OFFICE.

SIDNEY WILLIAM RICHARDSON AND WILLIAM STAVELEY, OF HOKITIKA, NEW ZEALAND.

SAFETY APPARATUS FOR MINING-CAGES.

1,103,841.      Specification of Letters Patent.      Patented July 14, 1914.

Application filed May 7, 1913. Serial No. 766,180.

*To all whom it may concern:*

Be it known that we, SIDNEY WILLIAM RICHARDSON and WILLIAM STAVELEY, citizens of the Dominion of New Zealand, and residing at Hokitika, in the Provincial District of Westland, in the Dominion of New Zealand, have invented certain new and useful Improvements in Safety Apparatus for Mining-Cages, of which the following is a specification.

The invention provides improvements in the class of safety apparatus used in connection with mining cages to minimize shock when the safety grips come into operation.

In some contrivances with which we are acquainted safety grip apparatus is located in an independent carriage from which the cage is suspended, the suspension means being designed to permit the cage to descend a certain distance and be gradually brought to rest after the carriage has become gripped in the shaft. The main principle of these contrivances being therefore well known, we have devised, for carrying it into effect, new apparatus which is simple in construction and reliable in operation.

According to our invention, when the main rope breaks the cage is suspended from a carriage which bears the safety grips by a rope independent of the main hauling rope, the suspension rope being coiled upon a drum, the rotation of which is gradually retarded by springs compressed by a screw rotated by the drum.

The invention is illustrated in the drawing wherein;—

Figure 2:
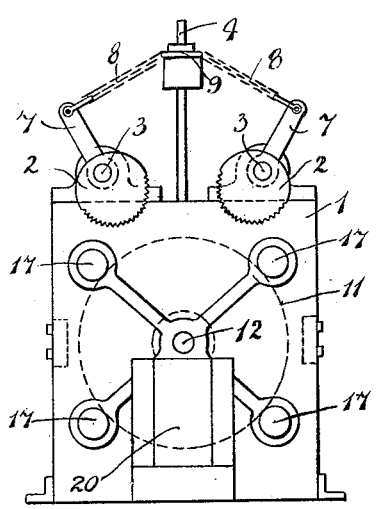
Figure 3:
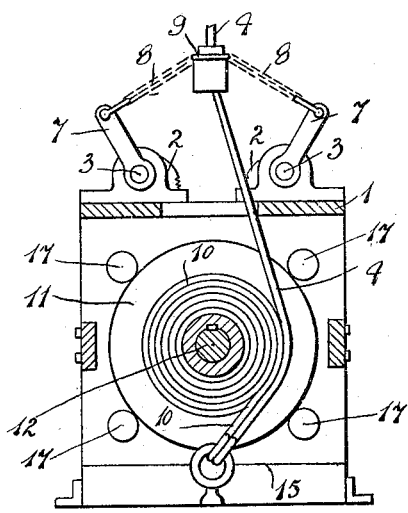

Figure 1 is a front sectional elevation, Fig. 2 an end elevation, and Fig. 3 an end sectional elevation.

The carriage 1 is provided with a well known form of grip apparatus consisting of the eccentric grip dogs 2 fixed upon rocking spindles 3 which, upon breakage of the rope 4 are partly rotated by coil springs 5 thereby causing the grip dogs to engage the cage guides 6. Arms 7 fixed upon said rocking spindles are connected by a chain 8 having a ring 9 through which the rope passes; a collar or the like upon the rope engaging the ring and causing the rope to take the tension of the chains 8.

In my invention when the main rope 4 breaks the cage is suspended by an independent rope 10 which is fixed at one end to and coiled upon a drum 11 fixed upon a spindle 12 rotatably mounted in the carriage.

The spindle 12 upon one side of the drum is provided with right hand screw threads and upon the other side with left hand threads, and these screws respectively pass through nuts 13 and 14 fixed in horizontally sliding crossheads 15 and 16, which are guided in the carriage, and have holes for the passage of spindles 17, projecting inwardly from the sides of the carriage and having upon them the spiral compression springs 18.

The carriage 1 has secured thereto slide members 20 adapted to engage the guides 6, and the top of the cage normally contacts with the bottom of the carriage 1 as shown in Fig. 1. Suitable guides are provided for the cage.

The main rope 4 is carried past the drum 11 and secured to the top of the cage 20. Upon breakage of the rope the grip dogs first comes into action in the usual manner and grip the carriage to the mine shaft guides. The cage continuing to descend, the rope attached thereto causes rotation of the drum, the rotation being increasingly retarded by the friction between the nuts and the screws due to the compression of the springs 18 between the crossheads 15 and 16 and the sides of the carriage until the cage is gradually brought to rest.

A squared end 19 of the spindle 12 enables a handle to be applied for turning the spindle when required.

What we do claim and desire to secure by Letters Patent of the United States is:—

1. Apparatus of the nature described comprising a mining cage connected directly to the main supporting rope, an independent carriage located above the cage, means carried by said carriage for automatically arresting the fall of the carriage upon breakage of said rope, a screw-threaded spindle rotatably mounted on said carriage, a drum fixed thereto, a rope coiled around said drum and fixedly connected at one end to the drum and at the other end to the cage, screw threaded nuts mounted on said spindle and carrying crossheads, and springs adapted to be compressed by said crossheads on rotation of the drum, substantially as described.

2. Apparatus of the nature described comprising a mining cage connected directly to the main supporting rope, cage guides, an independent carriage located above the cage, eccentric grip dogs mounted on said carriage, springs tending to throw said grip dogs into engagement with said cage guides, arms on said dogs, means for connecting said arms to a ring encircling the rope, a collar on the rope for engaging said ring, a screw-threaded spindle rotatably mounted on said carriage, a drum fixed thereto, a rope coiled around said drum and fixedly connected at one end to the drum and at the other end to the cage, screw threaded nuts mounted on said spindle and carrying crossheads, and springs adapted to be compressed by said crossheads on rotation of the drum, substantially as described.

In testimony whereof we have signed our names to this specification in the presence of two witnesses.

SIDNEY WILLIAM RICHARDSON.
WILLIAM STAVELEY.

Witnesses to signature of Sidney William Richardson:
ANNIE D. MCKENZIE,
EDNA J. COLLEY.

Witnesses to signature of William Staveley:
K. FORSYTH,
A. R. GUINNESS.

---

Copies of this patent may be obtained for five cents each, by addressing the "Commissioner of Patents, Washington, D. C."